(12) United States Patent
Saito et al.

(10) Patent No.: US 7,715,345 B2
(45) Date of Patent: May 11, 2010

(54) RADIO COMMUNICATION SYSTEM

(75) Inventors: Akihiro Saito, Yokohama (JP); Masao Yamaya, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 883 days.

(21) Appl. No.: 11/508,256

(22) Filed: Aug. 23, 2006

(65) Prior Publication Data

US 2007/0147319 A1 Jun. 28, 2007

(30) Foreign Application Priority Data

Dec. 27, 2005 (JP) ............................. 2005-374628

(51) Int. Cl.
*H04W 4/00* (2009.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 24/00* (2009.01)

(52) U.S. Cl. ..................... 370/331; 370/216; 370/242; 455/423

(58) Field of Classification Search ............... 370/236.2, 370/241.1, 242, 331, 338; 455/423, 67.11
See application file for complete search history.

(56) References Cited

U.S. PATENT DOCUMENTS 6,876,692 B2 * 4/2005 Shi et al. .................... 375/141
2006/0153085 A1 * 7/2006 Willins et al. ............... 370/242

FOREIGN PATENT DOCUMENTS

| JP | 2000-332674 | 11/2000 |
| JP | 2002-271280 | 9/2002 |
| JP | 2005-151189 | 6/2005 |

* cited by examiner

*Primary Examiner*—George Eng
*Assistant Examiner*—Chayce Bibbee
(74) *Attorney, Agent, or Firm*—Brundidge & Stanger, P.C.

(57) ABSTRACT

The normalities of access points including antenna facilities thereof are confirmed.

An access point includes a terminal function unit which has the transmission/reception functions of a radio terminal. A radio signal is transmitted from the terminal function unit to the signal processing unit of an access point through the antenna of the access point, and a process for the calling connection between the terminal function unit and a test server is executed through the antenna of the access point, and the antenna and signal processing unit of the access point (along a path). The normalities of the antenna of the access point and the access point, or the abnormality of any of them is judged in accordance with the success or failure of the calling connection.

2 Claims, 10 Drawing Sheets

RADIO COMMUNICATION SYSTEM

BACKGROUND OF THE INVENTION

The present invention relates to a radio communication system, and more particularly to a radio communication system for diagnosing the normalities of a radio access point and a network in a mobile communication system.

In operating the mobile communication system or the radio communication system, the stability of the system is one of important factors. For the stable operation of the system, it is required to prevent the occurrence of any failure leading to a system shutdown, and also to promptly detect the failure and resume the system operation in case of the occurrence of the failure. Accordingly, a normality verification method for the radio access point is very important. Besides, in the case where the failure has occurred, the degree of influence on users is important. In a case, for example, where any failure has occurred in a radio access point apparatus, the degree of importance differs depending upon whether or not the failure has the influence on the users, and a measure to counter the failure becomes different.

The mobile communication system or the radio communication system has a large service area divided into a large number of small areas called "cells", and has the radio access point apparatuses arranged in the respective cells. The radio access point apparatuses are connected to the network, and a user access terminal communicates with the radio access point apparatus of the cell to which this terminal corresponds, by radio, whereby the user access terminal is permitted to communicate with another access terminal connected to the network.

Patent Document 1, for example, discloses a technique for confirming the normalities of the radio access point apparatus and the network remotely and on-line. The technique is a method wherein a directional coupler is installed between the radio access point apparatus of the access point and an antenna, and it is connected with a test apparatus through a high-frequency cable. Here, in testing the access point, the portable telephone of the test apparatus is dialed for vocal communications from the stationary telephone of an operation center, thereby to test the access point and the network. Also, Patent Document 2, for example, discloses a technique wherein the same test method has been expanded into a method of confirming the normality of a packet data call processing function, not the vocal communications.

Besides, Patent Document 3, for example, discloses a radio test apparatus wherein an access terminal function portion included in the access point is used for conducting the antenna failure test, receiver failure test and transmitter failure test of the access point itself. This apparatus has been proposed by the inventors of the present application.

[Patent Document 1] JP-A-2000-332674
[Patent Document 2] JP-A-2002-271280
[Patent Document 3] JP-A-2005-151189

SUMMARY OF THE INVENTION

In the techniques stated in Patent Documents 1 and 2, the directional coupler is connected between the radio access point apparatus and the antenna, and the test terminal is connected thereto. Therefore, the techniques have the problem that the normality of the radio access point apparatus including an antenna facility cannot be confirmed. Since the normality including the antenna facility cannot be confirmed, a system shutdown sometimes occurs on account of the failure of the antenna facility even in a case where the radio access point apparatus and the network have been judged normal as the result of the test. For the solution of the problem, it is necessary to establish a method of testing the normalities of the radio access point apparatus which includes the antenna facility, and the network. Moreover, since the test terminal needs to be prepared in each radio access point apparatus, the cost of the radio access point apparatus per unit increases.

In view of the above drawbacks, the present invention has for its object to provide a radio communication system which confirms the normalities of a radio access point apparatus including an antenna facility, and a network, that is, the normality of the whole system. Another object of the invention is to provide a method and a system which can confirm the normality of the system even during the operation thereof. Still another object of the invention is to realize the confirmation of the normality of the whole system inexpensively. Yet another object of the invention is to permit decrease in the number of radio access point apparatuses in which access terminal function portions are installed, and to reduce the cost of the radio access point apparatuses.

In the invention, a test terminal termed "TAT (access terminal function portion)" is installed in a certain radio access point apparatus so as to execute a calling connection process. An access terminal function portion is not connected with the radio access point apparatus in which the TAT is installed, but it is connected with an adjacent radio access point apparatus, thereby to confirm the normality of the radio access point apparatus including the antenna facility thereof. The normality test of a plurality of adjacent radio access point apparatuses is conducted by the TAT installed in the radio access point apparatus, so that test terminals corresponding to the TATS need not be respectively installed in the individual radio access point apparatuses, and the cost can be reduced.

The TAT is the test terminal which is endowed with the same call processing function as that of a general access terminal. Owing to the endowment with the same call processing function as that of the general access terminal, a calling connection can be performed without influence on a general service.

According to the first solving means of this invention, there is provided, a radio communication system comprising:

a first access point which includes a first antenna, and a terminal function unit that is connected to the first antenna and that has transmission/reception functions of a radio terminal;

a second access point which includes a signal processing unit connected to a second antenna;

a test server which is for a calling connection with the terminal function unit; and a maintenance terminal which conducts a test for judging a normality or failure of the first antenna of said first access point, and said second access point; wherein:

said maintenance terminal designates a first access point identifier of said first access point and a second access point identifier of said second access point, said first access point and said second access point being subjects for the judgment of the normality or the failure; and transmits the designated second access point identifier to said first access point indicated by the designated first access point identifier;

said first access point:

receives the second access point identifier from said maintenance terminal;

transmits a radio signal from the terminal function unit through the first antenna to the signal processing unit of said second access point which is specified by the received second access point identifier, and executes a process for a calling connection between the terminal function unit and said test server, through the first antenna and the signal processing unit;

decides a connection result intending a success or failure of the calling connection, by the terminal function unit; and transmits the connection result to said maintenance terminal;

said maintenance terminal:

receives the connection result from said first access point; and displays the connection result on a display unit, or stores the connection result in a storage unit, or judges the normality or failure of the first antenna of said first access point and said second access point, in accordance with the connection result.

According to the second solving means of this invention, there is provided, a radio communication system comprising:

a first access point which includes first antennas of each of sectors, an access terminal function portion that has transmission/reception functions of a radio terminal, and a switch that connects the access terminal function portion with one of the first antennas of the respective sectors;

a second access point which includes signal processing portions of each of sectors respectively connected to second antennas;

a test server which is for a calling connection with the access terminal function portion; and a maintenance terminal which conducts a test for judging a normality or failure of the first antenna of said first access point, and said second access point; wherein:

said maintenance terminal:

designates a first access point identifier and a first sector identifier of said first access point and a second access point identifier and a second sector identifier of said second access point, the sectors of said first access point and said second access point being subjects for the judgment of the normality or the failure; and transmits the designated first sector identifier, second access point identifier and second sector identifier to said first access point in accordance with the designated first access point identifier;

said first access point:

receives the first sector identifier, second access point identifier and second sector identifier from said maintenance terminal;

connects the access terminal function portion with the first antenna of the sector indicated by the first sector identifier, by the switch in accordance with the received first sector identifier;

transmits a radio signal from the access terminal function portion through the connected first antenna to the signal processing portion of said second access point specified by the received second access point identifier and second sector identifier, and executes a process for a calling connection between the access terminal function portion and said test server, through the first antenna and the signal processing portion;

decides a connection result intending a success or failure of the calling connection, by the access terminal function portion; and transmits the connection result to said maintenance terminal;

said maintenance terminal:

receives the connection result from said first access point; and displays the connection result on a display unit, or stores the connection result in a storage unit, or judges the normality or failure of the first antenna of said first access point and said second access point, in accordance with the connection result.

According to the present invention, it is possible to provide a radio communication system which confirms the normalities of a radio access point apparatus including an antenna facility, and a network, that is, the normality of the whole system. According to the invention, it is possible to provide a method and a system which can confirm the normality of the system even during the operation thereof. Besides, according to the invention, it is possible to realize the confirmation of the normality of the whole system inexpensively. In addition, according to the invention, it is permitted to decrease the number of radio access point apparatuses in which TATs are installed, and to reduce the cost of the radio access point apparatuses.

DESCRIPTION OF THE PREFERRED EMBODIMENTS OF THE INVENTION

Now, radio access point apparatuses according to embodiments will be described in connection with the configuration of a radio access point communication network and a method of operating them, with reference to the drawings by exemplifying a "1xEV-DO (1x Evolution Data Only)" system. Incidentally, the "1xEV-DO" system is not restrictive, but any appropriate system may well be employed.

Figure 1:
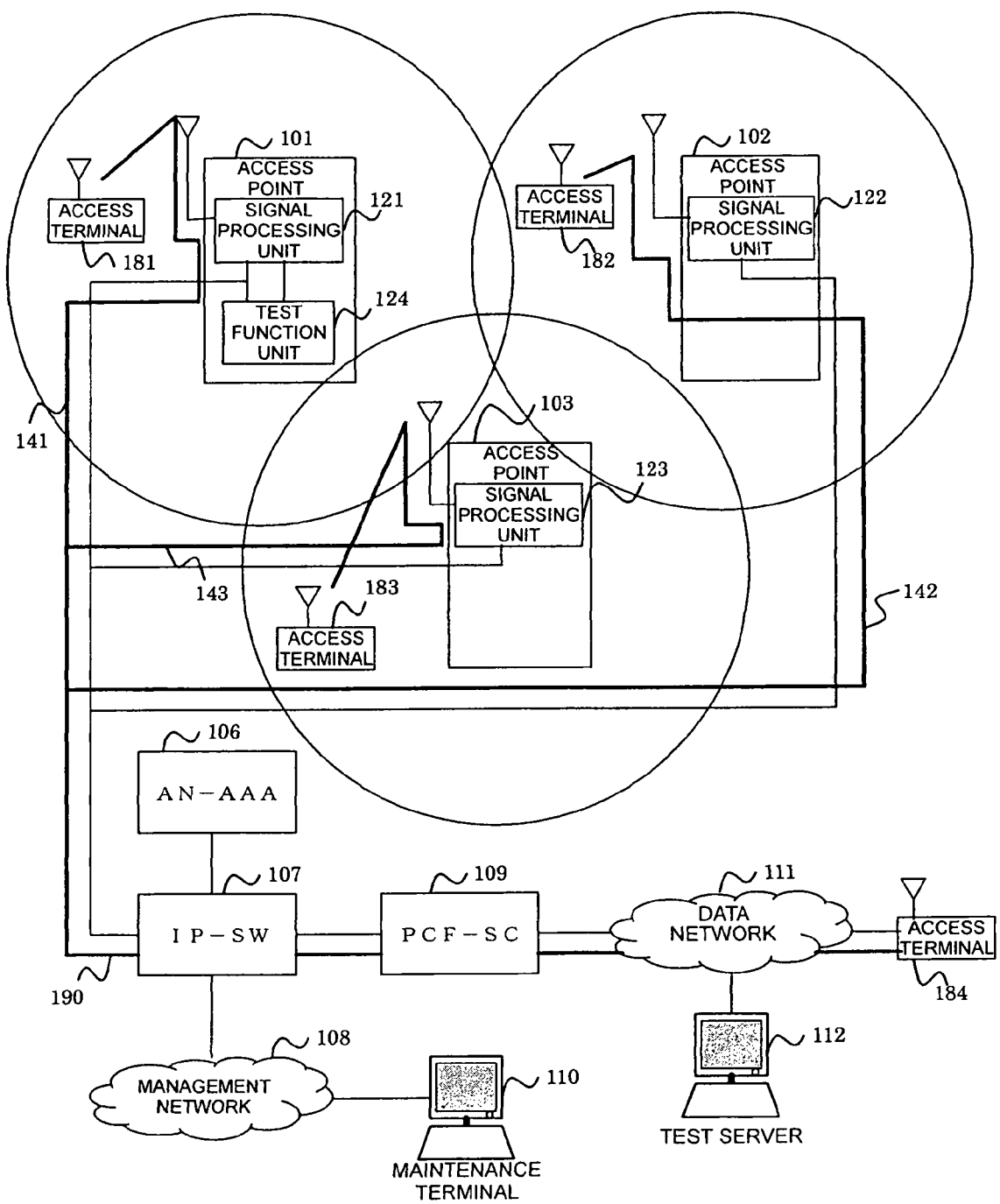
FIG. 1 is an architectural diagram of a radio access point test system in a "1xEV-DO" system in the present invention.
Figure 2:
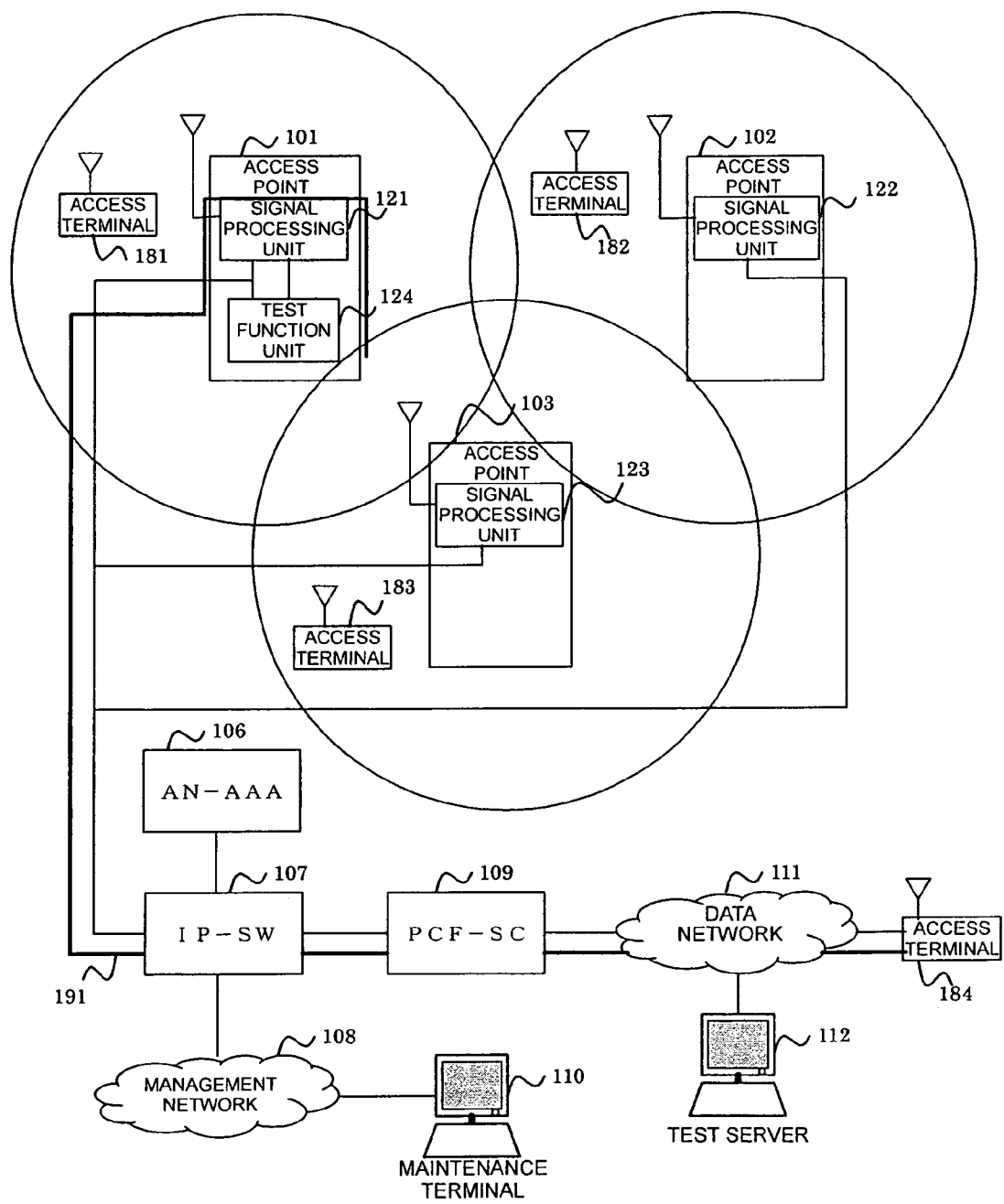
FIG. 2 is a diagram for explaining the diagnostic path of an access point 101 in the invention.
Figure 3:
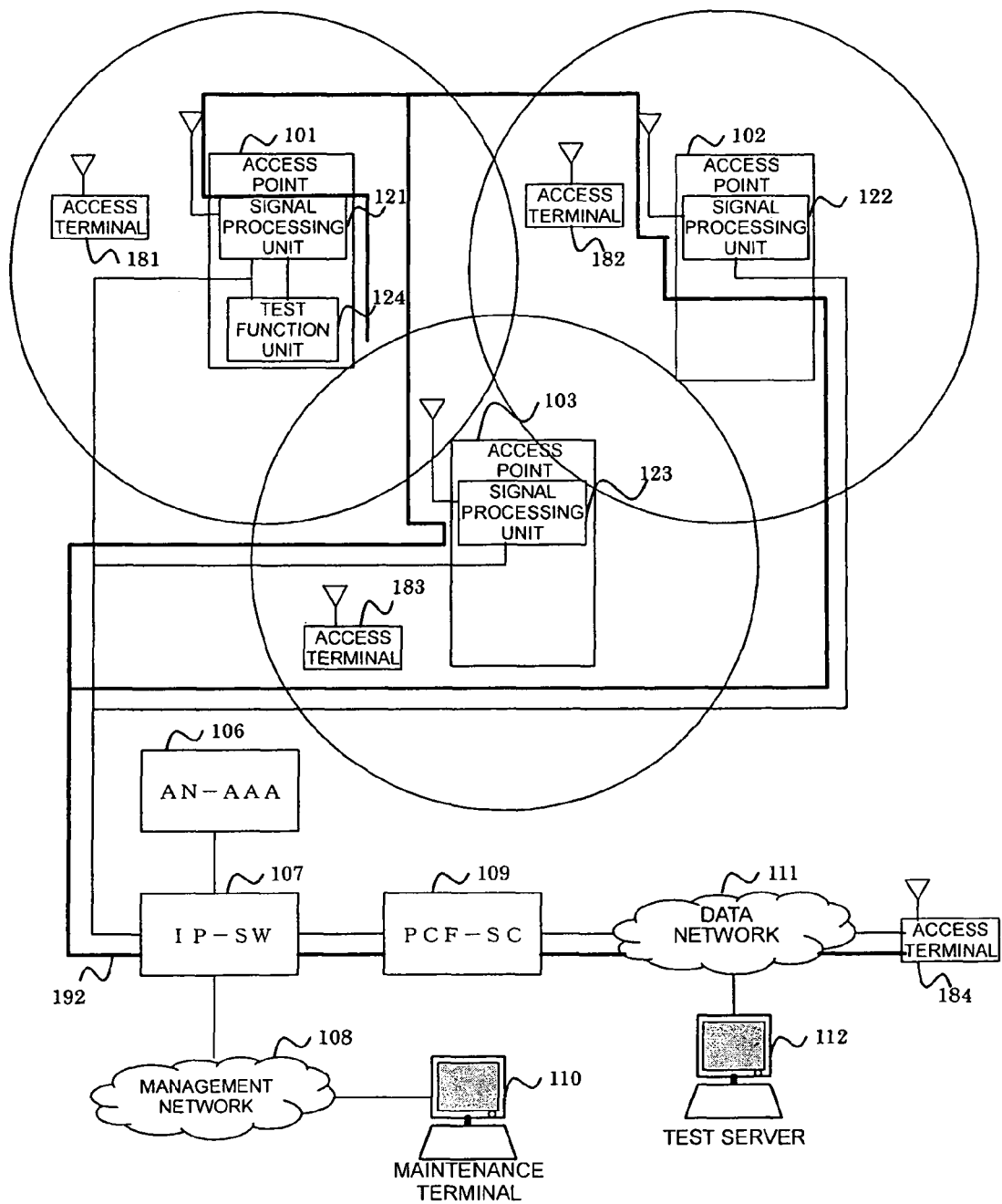
FIG. 3 is a diagram for explaining the diagnostic paths of access points 102 and 103 in the invention.

FIG. 1 is an architectural diagram of a radio access point testing system in the "1xEV-DO" system. Besides, FIGS. 2 and 3 are diagrams for explaining radio signal paths during tests, respectively. The outline of this embodiment will be described with reference to FIGS. 1 to 3.

The radio access point testing system includes an access point (radio access point apparatus, or first access point) 101 in which a signal processing unit 121 and a test function unit 124 are installed, access points (second access points) 102 and 103 in each of which a signal processing unit 122 or 123 is installed, an IP-SW (IP switch) 107, a PCF-SC (Packet Control Function-Session Control, or radio packet controller)

109, an AN-AAA (Access Network-Authentication, Authorization, and Accounting, or authentication unit) 106, a maintenance terminal 110, and a test server 112. Besides, the single access point in which the test function unit 124 is included is not restrictive, but an appropriate number of such access points may well be included. Also, the number of the access points in each of which the test function unit is not installed is not restricted to 2, but one such access point may well be included, or an appropriate number of such access points may well be included. By way of example, at least one of adjacent access points may well be furnished with the test function unit. Incidentally, all the access points may well be furnished with the test function units.

The access point 101 has the signal processing unit 121 which is connected to an antenna, and the test function unit 124. The access points 102 and 103 have the signal processing units 122 and 123 each of which is, for example, identical in configuration to the signal processing unit 121 of the access point 101, respectively. In FIG. 1, an access terminal 181 can communicate with another radio or wired access terminal 184 through the access point 101 as well as a main signal path 141, an access terminal 182 can communicate therewith through the access point 102 as well as a main signal path 142, and an access terminal 183 can communicate therewith through the access point apparatus 103 as well as a main signal path 143. In the figure, circles surrounding the access points 101, 102 and 103 visualize the cell ranges of the respective access points 101, 102 and 103.

The IP-SW 107 is connected to the access points 101, 102 and 103, etc., and it performs the switching of packets, etc. The AN-AAA 106 is a server for authenticating the access terminals, and it has the functions of the registrations, management, etc. of user information. The maintenance terminal 110 is connected to the access points 101, 102 and 103 via a management network 108 and the IP-SW 107, and it has the functions of monitoring and controlling the respective access points remotely. The PCF-SC 109 which is the radio packet controller, has the functions of the management of session information, the authentication of the access terminals, the control and termination of radio packets, etc. A test server 112 is a testing server, to which the test function unit 124 within the access point 101 is connected via a network (data network) 111.

Besides, as shown in FIG. 2, the test function unit 124 installed in the access point 101 can communicate with the test server 112 through a signal path 191 via the signal processing unit 121 of the access point 101. Thus, the test function unit 124 can confirm the normality of the access point 101. In this case, however, the antenna of the access point 101 is not passed, and hence, the antenna is not diagnosed yet.

Besides, as shown in FIG. 3, the test function unit 124 installed in the access point 101 is communicable with the test server 112, etc. through the access point 101, and it can also communicate with the test server 112 through a path 192 which extends via the antenna of the access point 101, and the access point 102 or 103. In this case, the test function unit 124 is connected with the test server 112 via the antenna of the access point 101 and that of the access point 102 or 103, and hence, it can confirm the normalities of the radio access point apparatus including the antenna facility, and the network.

Figure 4:
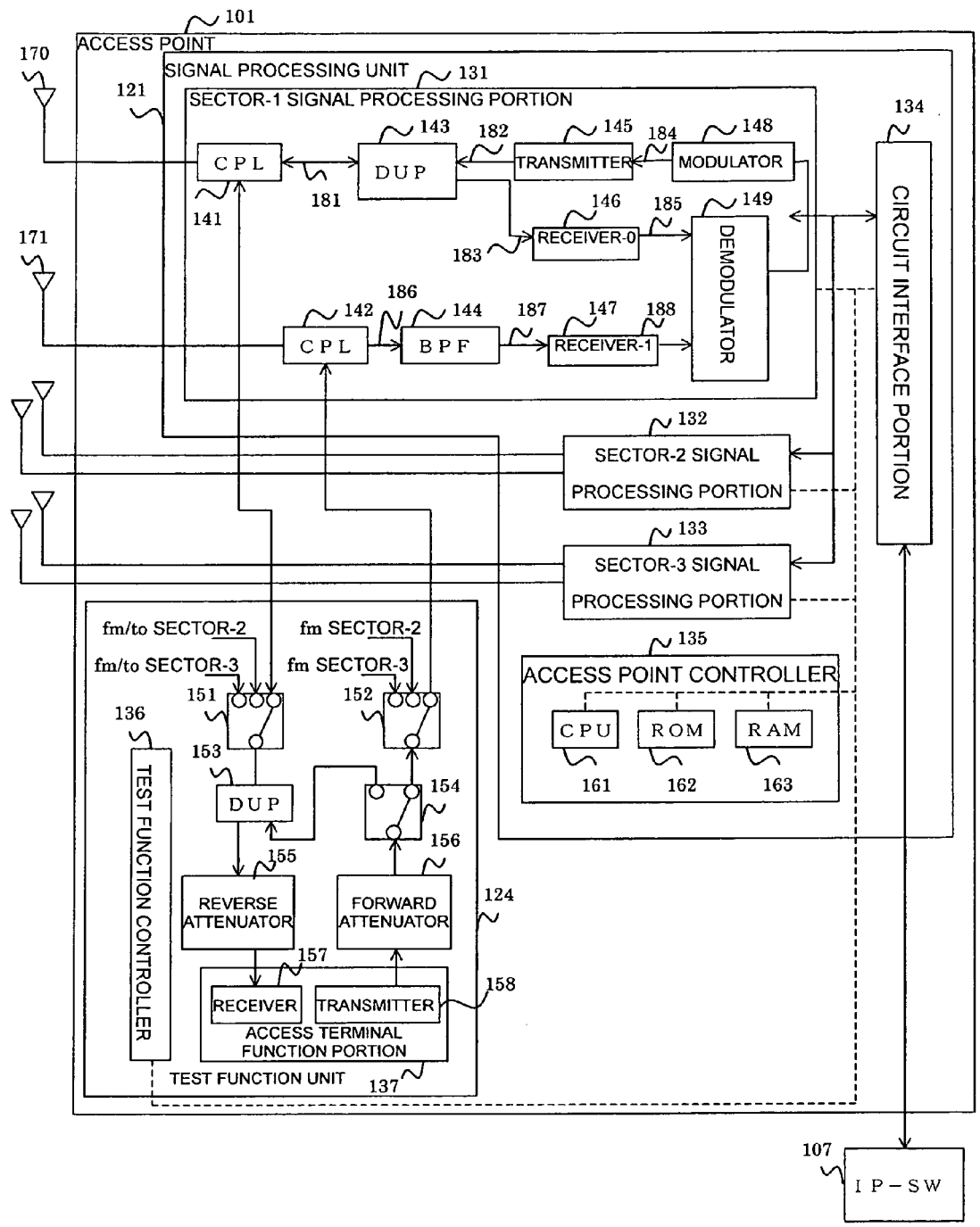
FIG. 4 is a detailed block diagram of the access point 101 in the invention.

FIG. 4 is a detailed block diagram of the access point 101. The access point 101 includes the signal processing unit 121, and the test function unit 124. The signal processing unit 121 within the access point 101 has the signal processing portions of respective sectors corresponding to three sectors (sector-1 signal processing portion 131, sector-2 signal processing portion 132, and sector-3 signal processing portion 133), a circuit interface 134, and an access point controller 135. Incidentally, an example in FIG. 4 illustrates the access point of the 3-sector configuration which includes a transmitter of one loop and receivers of two loops (loop-0 and loop-1) per sector, and which incarnates diversity reception. By the way, the sectors and the transmission and reception loops are not restrictive, but they may well be in appropriate numbers. It is also allowed to employ only one sector.

The sector-1 signal processing portion 131 includes a DUP (duplexer) 143 which separates a reverse signal 182 and a forward signal 183, a BPF (band-pass filter) 144 which limits the pass band of the forward radio signal from an antenna 171, and the transmitter 145 of one loop and the receivers of two loops (receiver-0 146 and receiver-1 147). Besides, the sector-1 signal processing portion 131 includes a modulator 148, a demodulator 149, and CPLs (directional couplers) 141 and 142. The modulator 148 and the demodulator 149 modulate and demodulate data, respectively. The CPL 141 connects the DUP 143, an antenna 170 and an SW (switch) 151 (path to an access terminal function portion 137) with each other. On the other hand, the CPL 142 connects the antenna 171, the BPF 144 and an SW 152 (path to the access terminal function portion 137) with each other. Incidentally, only the internal configuration of the sector-1 signal processing portion 131 is shown in FIG. 4. Since, however, the configuration of each of the sector-2 signal processing portion 132 and sector-3 signal processing portion 133 can be made the same as that of the sector-1 signal processing portion 131, it shall be omitted from description.

The circuit interface portion 134 is the interface between the access point 101 and the IP-SW 107. The access point controller 135 has the functions of monitoring and controlling the access point 101. By way of example, the access point controller 135 includes a CPU 161, a ROM 162 and a RAM 163.

The test function unit 124 includes a test function controller 136, the access terminal function portion 137, switches 151, 152 and 154 in the number of, for example, 3, and a DUP 153. Incidentally, an appropriate number of switches may well be included without being restricted to the above. Besides, the test function unit 124 may well further include a reverse attenuator 155 and a forward attenuator 156 for the access terminal function portion 137. The access terminal function portion 137 is a testing terminal which has functions equivalent to those of the access terminal 181 or the like which a general user uses. By way of example, the access terminal function portion 137 includes a transmitter 158 and a receiver 157. The test function controller 136 controls the access terminal function portion 137, and it has the functions of setting the three switches 151, 152 and 154 mounted in the test function unit 124, and setting the attenuation magnitudes of the reverse attenuator 155 and forward attenuator 156. Incidentally, the test function controller 136 is connected with the various parts of the test function unit 124. The SWs 151 and 152 have the functions of switching the sectors to-be-tested. Besides, the SW 154 effects the switching between a path passing through the receiver-0 146 of the access point 101 and a path passing through the receiver-1 147.

Figure 5:
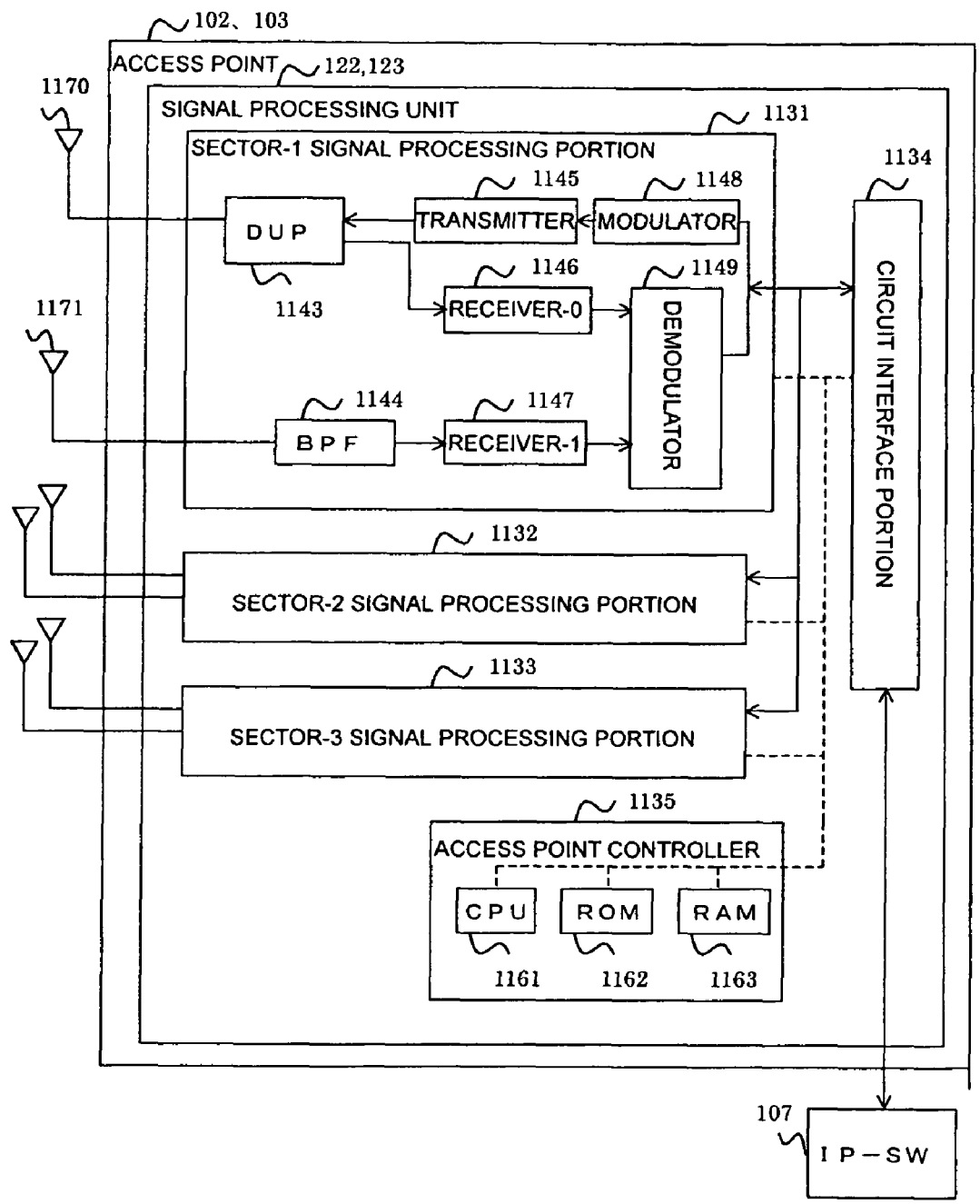
FIG. 5 is a detailed block diagram of the access point 102 in the invention.

FIG. 5 is a detailed block diagram of the access point 102 (or 103). The signal processing unit 122 (or 123) of the access point 102 (or 103) includes the signal processing portions 1131, 1132 and 1133 of the respectively corresponding sectors, a circuit interface portion 1134, and an access point controller 1135. Since the individual parts of the signal processing unit 122 (or 123) installed in the access point 102 (or 103) are the same as those of the signal processing unit 121 installed in the access point 101, they shall be omitted from description. Incidentally, the CPLs 141 and 142 included in the access point 101 can be dispensed with in the access point 102 (or 103).

Figure 6:
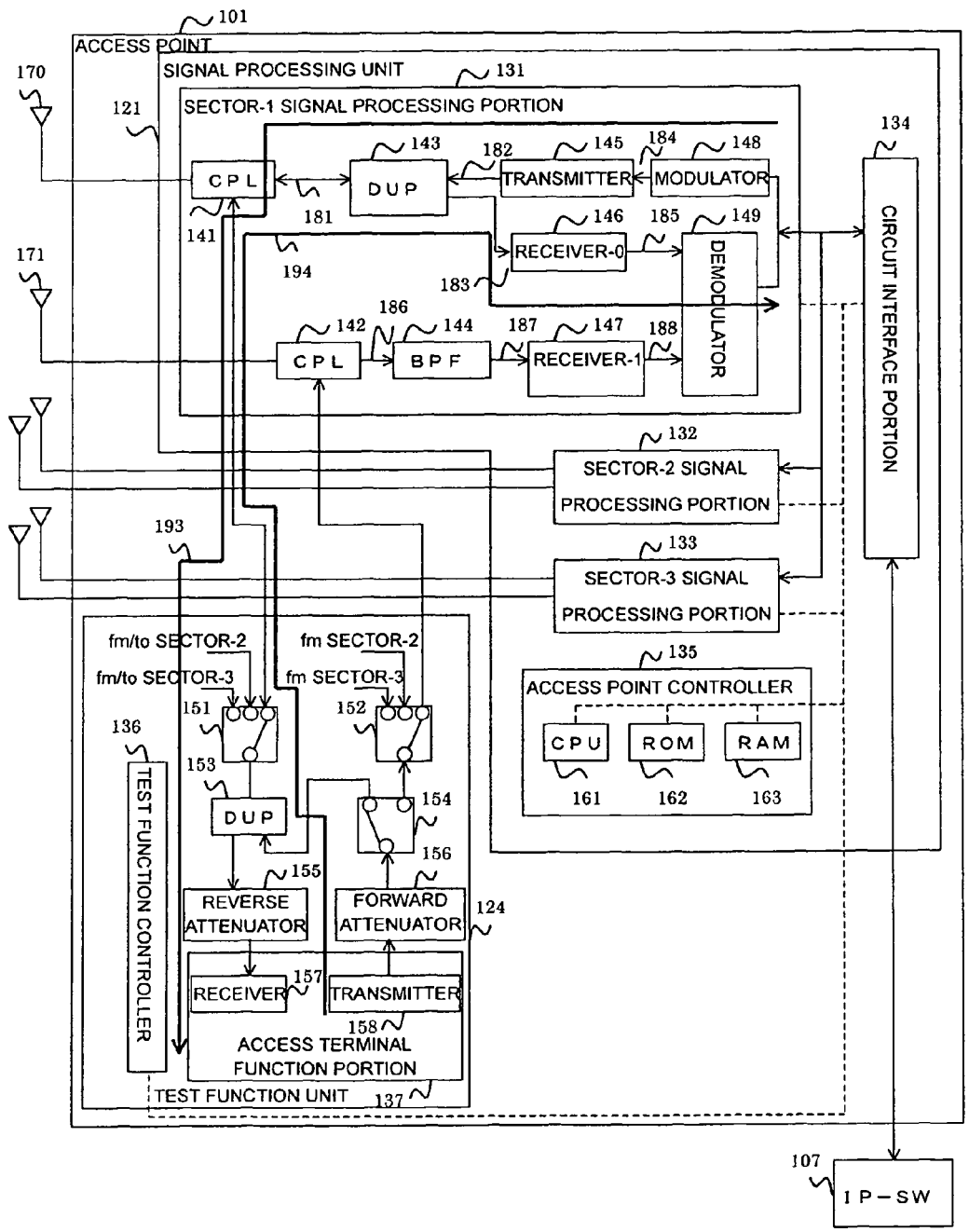
FIG. 6 shows the diagnostic path of the access point 101 in the diagnosis of this access point 101 in the invention.
Figure 7:
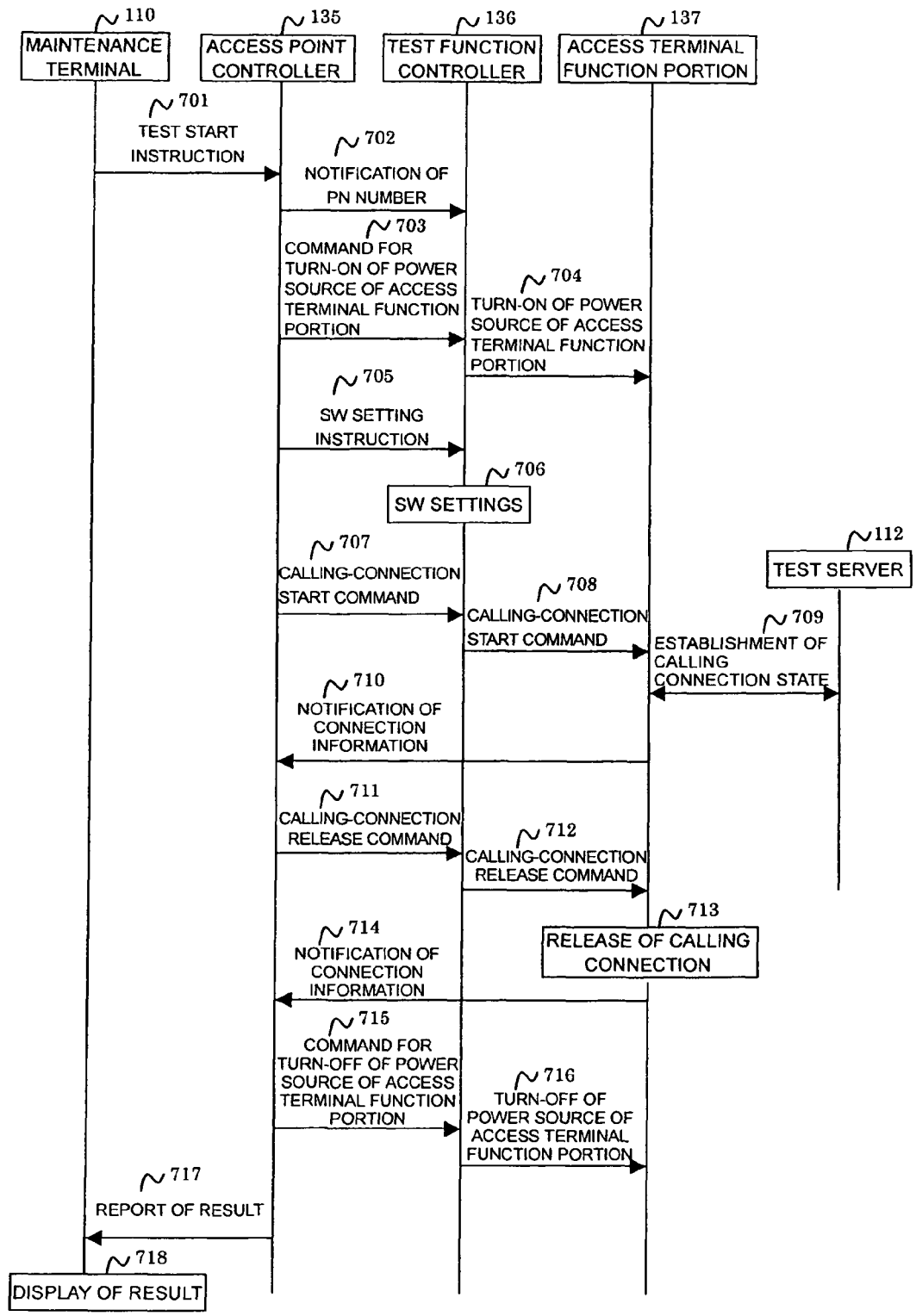
FIG. 7 is a diagram for explaining a sequence in the case of diagnosing the access point 101 which does not include an antenna facility, in the invention.

FIG. 6 is a diagram for explaining a sequence in the case of conducting a diagnostic test. FIG. 7 is a sequence diagram of a diagnostic method for the access point 101 except the antenna facility thereof. Incidentally, since a diagnostic method for the access point 101 including the antenna thereof can be performed by the same procedure as that of a diagnostic method for the access point 102 including the antenna, it shall be omitted from description. Besides, signals "Ack" replying to requests shall be omitted because they are ordinarily existent.

The diagnostic test is started, for example, in such a way that a maintenance engineer inputs a command for the execution of a diagnosis, to the maintenance terminal 110. The diagnosis execution command contains diagnostic conditions such as the designation of the access point to-be-diagnosed (first access point ID) and the designations of the sector to-be-diagnosed (first sector ID) and the receiver to-be-diagnosed (receiver ID indicating the loop-0 or loop-1). Here, description will be made assuming the diagnosis of the loop-0 of the sector-1 in the access point 101. Incidentally, apart from the input by the maintenance engineer, the diagnosis of the access point may well be started at an appropriate timing, for example, in such a way that a measurement is started at a predetermined time in accordance with a schedule stipulated beforehand.

At a step 701, the maintenance terminal 110 notifies a diagnosis start instruction containing the designated diagnostic conditions, to the access point controller 135 of the access point 101 in which the test function unit 124 is installed. Incidentally, the designations of the sector and the reception loop to-be-diagnosed may well be omitted so as to successively conduct diagnoses for all the sectors and reception loops of the access point 101.

At a step 702, the access point controller 135 notifies the PN (pseudo noise) No. of the sector to-be-diagnosed to the test terminal controller 136. The "PN No." is the No. which is used for identifying the access point/the access terminal. Incidentally, apart from the PN No., an appropriate sector identifier for identifying the access point and the sector may well be employed.

At a step 703, the access point controller 135 receives the diagnosis start instruction, and it commands the test function controller 136 to turn ON the power source of the access terminal function portion 137, in compliance with the received instruction (power-source turn-ON command). At a step 704, the test terminal controller 136 turns ON the power source of the access terminal function portion 137.

At a step 705, the access point controller 135 instructs the test terminal controller 136 to set the switches. At a step 706, the test terminal controller 136 changes-over the switches of the test function unit 124. By way of example, the test terminal controller 136 sets the switch 151 onto the side of the sector-1 in accordance with the received first sector ID, and it sets the switch 154 onto the side of the loop-0 (receiver-0) in accordance with the received receiver ID. At a step 707, the access point controller 135 instructs the test function controller 136 to start a calling connection (calling-connection start command). At a step 708, the test function controller 136 instructs the access terminal function portion 137 to start the calling connection. The instruction on this occasion can contain the PN No. At a step 709, the access terminal function portion 137 dials up the test server 112 via the signal processing unit of the access point 101 so as to establish a calling connection state. By way of example, the reverse link of the access point 101 passes through a path 193 in FIG. 6, while the forward link of the receiver-0 passes through a path 194 in FIG. 6. By way of example, a signal which is transmitted from the access terminal function portion 137 reaches the side of the antenna 170 through the CPL 141, but it is not subjected to signal processing in any other access point through the antenna 170 because the PN No. indicates the sector-1 signal processing portion 131 of the access point 101.

When the calling connection state has been established here, the normality of the access point 101 except the antenna facility thereof can be confirmed. The access point and the sector which are passed in order to establish the calling connection state by dialing up the test server 112, are determined by the PN Nos. which have been notified at the steps 702 and 708. Incidentally, connection destination information items such as the dial No. of the test server 112 can be stored in an appropriate memory within the access point controller 135 or the test terminal controller 136 beforehand.

At a step 710, the access terminal function portion 137 notifies the access point controller 135 of "connection information" which contains information indicating whether the calling connection via the sector and receiver to-be-diagnosed has succeeded or failed. Incidentally, the access terminal function portion 137 and the access point controller 135 are capable of transmitting and receiving data to and from each other through, for example, the test function controller 136.

At a step 711, the access point controller 135 commands the test terminal controller 136 to release the calling connection (calling-connection release command). At a step 712, the test function controller 136 notifies the calling-connection release command from the access point controller 135, to the access terminal function portion 137. At a step 713, the access terminal function portion 137 releases the calling connection in compliance with the calling-connection release command. At a step 714, the access terminal function portion 137 notifies the access point controller 135 of "connection information" which contains information indicating that the calling connection has been released.

At a step 715, the access point controller 135 commands the test function controller 136 to turn OFF the power source of the access terminal function portion 137 (power-source turn-OFF command). At a step 716, the test terminal controller 136 turns OFF the power source of the access terminal function portion 137. At a step 717, the access point controller 135 reports the result of the diagnosis to the maintenance terminal 110. Here, the result of the diagnosis contains information which indicates whether the calling connection notified at the step 710 has succeeded or failed.

At a step 718, the maintenance terminal 110 receives the diagnostic result, and it displays the received diagnostic result on a display unit and/or stores the same in a storage unit, whereupon the diagnostic test of the access point 101 is ended. Besides, if the calling connection has succeeded, the maintenance terminal 110 can confirm the normalities of the radio access point apparatus except the antenna facility of the access point 101, and the network. On the other hand, if the calling connection has failed, the maintenance terminal 110 can confirm that the radio access point apparatus except the antenna facility of the access point 101, or the network is abnormal.

Figure 8:
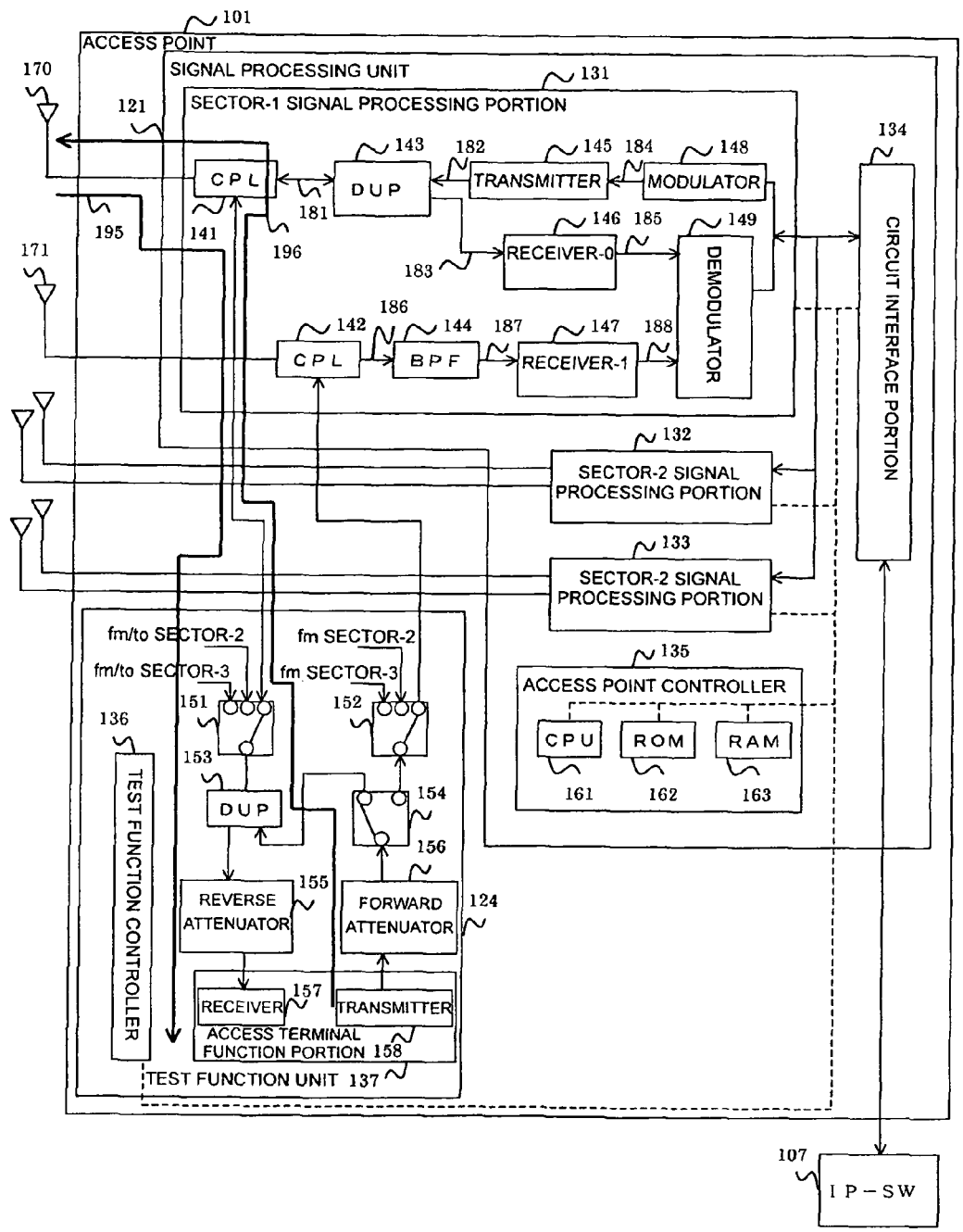
FIG. 8 shows the diagnostic path of the access point 101 in the diagnosis of the access point 102 or 103 in the invention.
Figure 9:
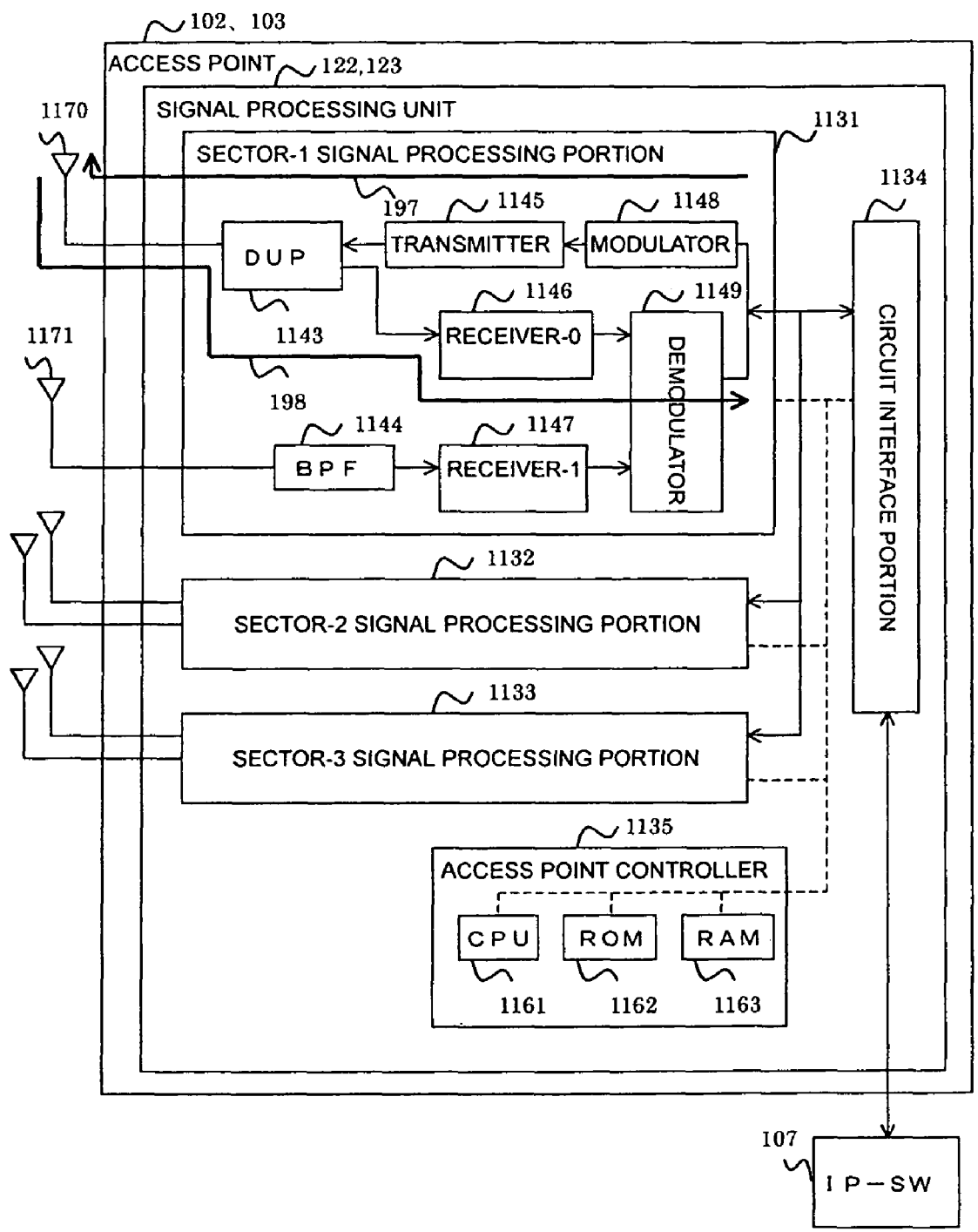
FIG. 9 shows the diagnostic path of the access point 102 or 103 in the diagnosis of this access point 102 or 103 in the invention.
Figure 10:
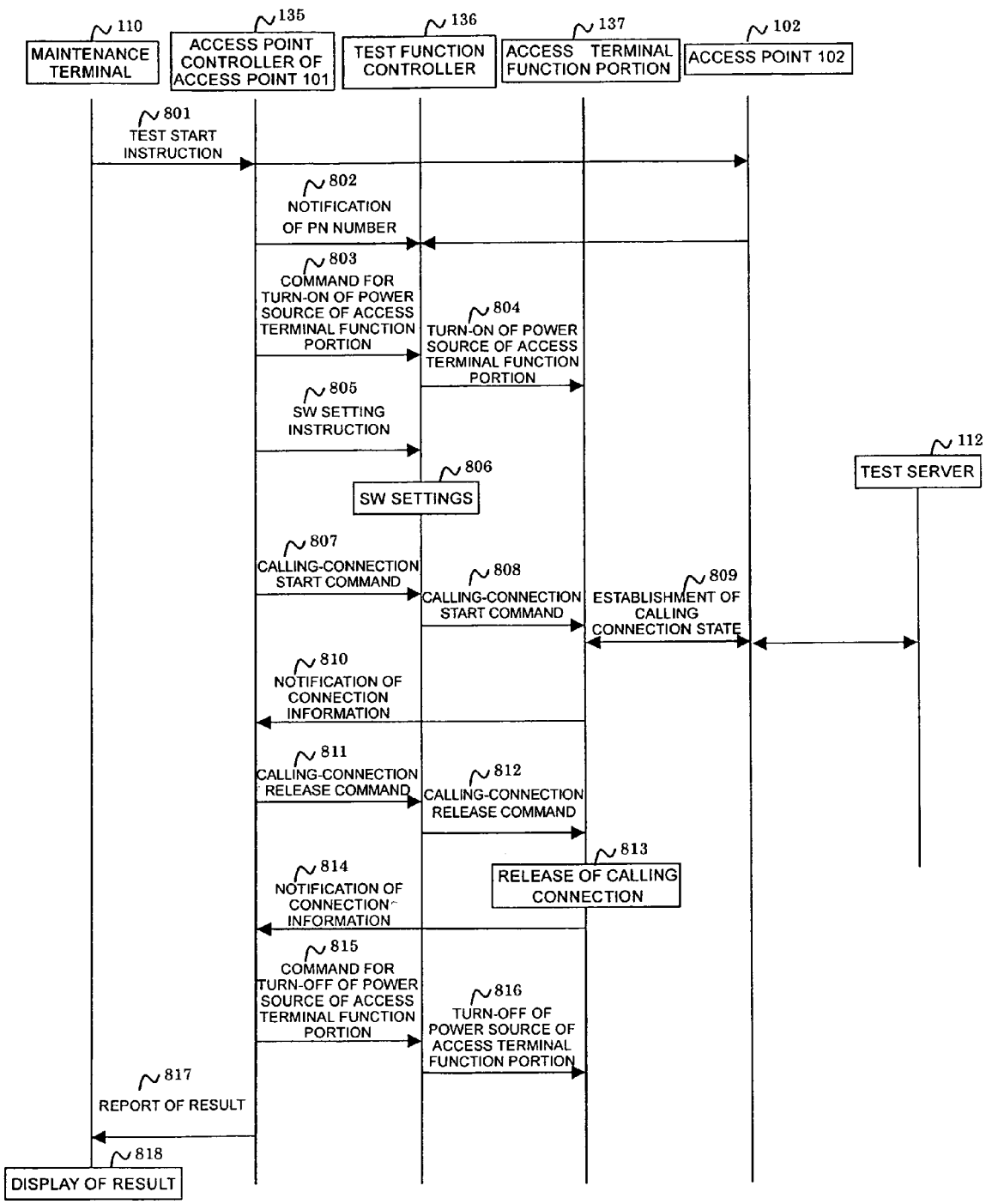
FIG. 10 is a diagram for explaining a sequence in the case of diagnosing the antenna facility of the access point 101, and the access point 102 or 103 which includes the antenna facility thereof, in the invention.

FIGS. 8 and 9 are diagrams for explaining a diagnostic method for the antenna facility of the access point 101, and the access point 102 including the antenna facility thereof. FIG. 10 is a sequence diagram of the diagnostic method for the antenna facility of the access point 101, and the access point 102 including the antenna facility thereof. Incidentally, a diagnostic method for the access point 103 including the antenna facility thereof can be performed by the same procedure as that of the diagnostic test of the access point 102 including the antenna facility thereof, and it shall therefore be omitted.

The diagnostic test is started, for example, in such a way that a maintenance engineer inputs a command for the execution of a diagnosis, to the maintenance terminal 110. The diagnosis execution command contains diagnostic conditions such as the access point whose access terminal function portion is to be used (first access point ID), the sector to-be-used of the access point in which the access terminal function portion to-be-used is installed (first sector ID), and the access point and its sector which are to be passed (second access point ID and second sector ID). Further, the designation of a reception loop (loop-0 or loop-1, namely, receiver-0 or receiver-1) may well be contained. Here, description will be made assuming the diagnosis of the access point 102 including the antenna facility of the sector-1 and receiver-0, and the diagnosis of the antenna facility of the access point 101. It is assumed, for example, that the first access point ID indicating the access point 101, the first sector ID indicating the sector-1, the second access point ID indicating the access point 102, and the second sector ID indicating the sector-1 have been inputted by the maintenance engineer. Incidentally, apart from the input by the maintenance engineer, the diagnosis of the access point may well be started at an appropriate timing, for example, in such a way that the diagnosis is started at a predetermined time in accordance with a schedule stipulated beforehand.

At a step 801, the maintenance terminal 110 notifies the diagnosis start instruction containing the designated diagnostic conditions, to the access point controller 135 of the access point 101 in which the test function unit 124 is installed, and the access point controller 135 of the access point 102 which is to be passed, in accordance with the first access point ID and the second access point ID, respectively. The information items which are to be notified, and the access points to which the information items are to be notified, can be appropriately omitted. Incidentally, the designations of the sector and the reception loop to-be-diagnosed may well be omitted so as to successively conduct diagnoses for all the sectors and reception loops of the access point 102.

At a step 802, the access point controller 135 of the access point 101 or the access point controller 1135 of the access point 102 notifies the PN No. of the sector of the access point to-be-diagnosed to the test terminal controller 136. By way of example, the access point controller notifies the PN No. of the sector-1 of the access point 102 in accordance with the notified second access point ID and second sector ID. Incidentally, the PN No. is stored in the memories of the respective access points beforehand, in correspondence with the second access point ID and the second sector ID, and the respective access points can refer to the stored PN No. Besides, the PN Nos. of the individual sectors of the respective access points may well be stored in a memory within the maintenance terminal 110 in order that, when the maintenance engineer has inputted the diagnostic conditions to the maintenance terminal, this maintenance terminal may read out the corresponding PN No. from the memory so as to notify the read-out PN No. to the access point controller 135 of the access point 101 in which the test function unit 124 is installed. Besides, the PN Nos. of the individual sectors of the adjacent access points may well be stored in the access point controllers 135 and 1135 of the respective access points in order that the maintenance terminal 110 may read out the corresponding PN No. from the access point controller 1135 of the access point to-be-diagnosed 102 at the execution of the diagnosis so as to notify the read-out PN No. to the access point controller 135 of the access point 101 in which the test function unit 124 is installed. Incidentally, the processing of the step 802 may well be executed at an appropriate timing, for example, when the access terminal function portion 137 has been connected to the access point controller 135.

At a step 803, the access point controller 135 of the access point 101 receives the diagnosis start instruction, and it commands the test function controller 136 to turn ON the power source of the access terminal function portion 137, in compliance with the received instruction (power-source turn-ON command). At a step 804, the test terminal controller 136 turns ON the power source of the access terminal function portion 137.

At a step 805, the access point controller 135 of the access point 101 instructs the test terminal controller 136 to set the switches. At a step 806, the test terminal controller 136 changes-over the switches of the test function unit 124. By way of example, the test terminal controller 136 sets the switch 151 onto the side of the sector-1 and the switch 154 onto the side of the loop-0 (receiver-0) in accordance with the first sector ID.

At a step 807, the access point controller 135 of the access point 101 instructs the test function controller 136 to start a calling connection (calling-connection start command). At a step 808, the test function controller 136 instructs the access terminal function portion 137 to start the calling connection. The instruction on this occasion can contain the notified PN No. At a step 809, the access terminal function portion 137 dials up the test server 112 via the antenna of the access point 101 and the access point 102 so as to establish a calling connection state. A reverse link passes through a path 197 in FIG. 9 and a path 195 in FIG. 8, while a forward link passes through a path 196 in FIG. 8 and a path 198 in FIG. 9. By way of example, a signal which is transmitted from the access terminal function portion 137 reaches the sides of the DUP 143 and receiver-0 146 through the CPL 141, but it is not subjected to signal processing on the side of the receiver-0 146 because the PN Nos. indicate the sector-1 signal processing portion 1131 of the access point 102.

When the calling connection state has been established here, the normalities of the antenna facility of the access point 101, and the access point 102 including the antenna facility thereof can be confirmed. The access point and the sector which are passed in order to establish the calling connection state by dialing up the test server 112, are determined by the PN Nos. which have been notified at the steps 802 and 807.

When the diagnostic test is conducted, the terminal information of the access terminal function portion 137 is notified to the access point 101 in which the test terminal 137 is installed, and the access point 102 which is passed (at, for example, the step 801). In a case where the access points 101 and 102 have been connected by the terminal in the notification, they notify the PN No. of a connection destination to the terminal. The terminal performs a calling connection to the notified PN No. Although the PN No. notification to the terminal is given by the access points 101 and 102 in this embodiment, it may well be given by only the access point 101 or another adjacent access point. Besides, different values are set for the individual access points and the individual sectors as PN Nos. Incidentally, connection destination information items such as the dial No. of the test server 112 can be stored in an appropriate memory inside or outside the access point controller 135 or the test terminal controller 136 beforehand.

At a step 810, the access terminal function portion 137 notifies the access point controller 135 of "connection information" which contains information indicating whether the calling connection via the sector and receiver to-be-diagnosed has succeeded or failed. Incidentally, the access terminal function portion 137 and the access point controller 135 are capable of transmitting and receiving data to and from each other through, for example, the test function controller 136.

At a step 811, the access point controller 135 of the access point 101 commands the test terminal controller 136 to release the calling connection (calling-connection release command). At a step 812, the test function controller 136 notifies the calling-connection release command from the access point controller 135 of the access point 101, to the access terminal function portion 137. At a step 813, the access terminal function portion 137 releases the calling connection in compliance with the calling-connection release command. At a step 814, the access terminal function portion 137 notifies the access point controller 135 of the access point 101 of "connection information" which contains information indicating that the calling connection has been released.

At a step 815, the access point controller 135 of the access point 101 commands the test function controller 136 to turn OFF the power source of the access terminal function portion 137 (power-source turn-OFF command). At a step 816, the test terminal controller 136 turns OFF the power source of the access terminal function portion 137. At a step 817, the access point controller 135 of the access point 101 reports the result of the diagnosis to the maintenance terminal 110. Here, the result of the diagnosis contains information which indicates whether the calling connection notified at the step 810 has succeeded or failed.

At a step 818, the maintenance terminal 110 receives the diagnostic result, and it displays the received diagnostic result on a display unit and/or stores the same in a storage unit, whereupon the diagnostic test of the access point 101 is ended. Besides, if the calling connection has succeeded, the maintenance terminal 110 can confirm the normalities of the antenna facility of the access point 101, and the access point 102 including the antenna facility thereof, and the normality of the network. On the other hand, if the calling connection has failed, the maintenance terminal 110 can confirm that the antenna facility of the access point 101, the radio access point apparatus of the access point 102 including the antenna facility thereof, or the network is abnormal.

Incidentally, the test can be conducted separately as the process in FIG. 7 or as the process in FIG. 10, or in combination of both the processes. Besides, the processes may well be executed in an appropriate sequence.

According to the invention, a diagnostic test for the normalities of a radio access point apparatus including an antenna facility, and a network can be realized inexpensively.

The invention is applicable to, for example, industries which concern a mobile communication system or access point.

What is claimed is:

1. A radio communication system comprising:
    a first access point which includes first antennas of each of sectors, an access terminal function portion that has transmission/reception functions of a radio terminal, and a switch that connects the access terminal function portion with one of the first antennas of the respective sectors;
    a second access point which includes signal processing portions of each of sectors respectively connected to second antennas;
    a test server which is for a calling connection with the access terminal function portion; and
    a maintenance terminal which conducts a test for judging a normality or failure of the first antenna of said first access point, and said second access point,
    wherein said maintenance terminal:
        designates a first access point identifier and a first sector identifier of said first access point and a second access point identifier and a second sector identifier of said second access point, the sectors of said first access point and said second access point being subjects for the judgment of the normality or the failure; and
        transmits the designated first sector identifier, second access point identifier and second sector identifier to said first access point in accordance with the designated first access point identifier,
    wherein said first access point:
        receives the first sector identifier, second access point identifier and second sector identifier from said maintenance terminal;
        connects the access terminal function portion with the first antenna of the sector indicated by the first sector identifier, by the switch in accordance with the received first sector identifier;
        transmits a radio signal from the access terminal function portion through the connected first antenna to the signal processing portion of said second access point specified by the received second access point identifier and second sector identifier, and executes a process for a calling connection between the access terminal function portion and said test server, through the first antenna and the signal processing portion;
        decides a connection result intending a success or failure of the calling connection, by the access terminal function portion; and
        transmits the connection result to said maintenance terminal,
    wherein said maintenance terminal:
    receives the connection result from said first access point; and
    displays the connection result on a display unit, or stores the connection result in a storage unit, or judges the normality or failure of the first antenna of said first access point and said second access point, in accordance with the connection result,
    wherein said first access point further includes second signal processing portions of the respective sectors,
    wherein said maintenance terminal further designates a first access point identifier and a first sector identifier of said first access point, and transmits the designated first sector identifier to said first access point which is indicated by the designated first access point identifier,
    wherein said first access point further:
        receives the first sector identifier from said maintenance terminal;
        connects the access terminal function portion with the second signal processing portion of the sector which is indicated by the received first sector identifier;
        outputs a signal from the access terminal function portion to the connected second signal processing portion, and executes a process for a calling connection between the access terminal function portion and said test server, through the second signal processing portion;

decides a second connection result intending a success or failure of the calling connection, by the access terminal function portion; and transmits the second connection result to said maintenance terminal, and wherein said maintenance terminal further:

receives the second connection result from said first access point; and displays the second connection result on the display unit, or stores the second connection result in the storage unit, or judges a normality or failure of said first access point in accordance with the second connection result.

2. A radio communication system according to claim 1, wherein one of said maintenance terminal, said first access point and said second access point notifies a pseudo noise (PN) number for identifying the sector as correspond to the second access point identifier and the second sector identifier, to the access terminal function portion, and wherein the access terminal function portion transmits the radio signal to the signal processing portion of said second access point using the PN number.

* * * * *